United States Patent
Wang et al.

(10) Patent No.: US 11,249,914 B2
(45) Date of Patent: Feb. 15, 2022

(54) SYSTEM AND METHODS OF AN EFFICIENT CACHE ALGORITHM IN A HIERARCHICAL STORAGE SYSTEM

(71) Applicant: VMware, Inc., Palo Alto, CA (US)

(72) Inventors: Wenguang Wang, Santa Clara, CA (US); Enning Xiang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 681 days.

(21) Appl. No.: 15/097,159

(22) Filed: Apr. 12, 2016

(65) Prior Publication Data
US 2017/0293570 A1    Oct. 12, 2017

(51) Int. Cl.
*G06F 12/0891* (2016.01)
*G06F 12/0804* (2016.01)
*G06F 12/0868* (2016.01)

(52) U.S. Cl.
CPC ...... *G06F 12/0891* (2013.01); *G06F 12/0804* (2013.01); *G06F 12/0868* (2013.01); *G06F 2212/222* (2013.01); *G06F 2212/60* (2013.01)

(58) Field of Classification Search
CPC .......................... G06F 12/0891; G06F 12/121
See application file for complete search history.

(56) References Cited

U.S. PATENT DOCUMENTS

| | | | | |
|---|---|---|---|---|
| 7,502,884 B1* | 3/2009 | Shah | .................. | H04L 67/1097 370/395.21 |
| 8,181,035 B1* | 5/2012 | Fernandez Gutierrez | .................. | H04L 9/3242 713/187 |
| 8,706,971 B1* | 4/2014 | Nayak | ................. | G06F 11/1453 711/133 |
| 9,075,733 B1* | 7/2015 | Feldman | ............. | G06F 12/0292 |
| 2005/0055512 A1* | 3/2005 | Kishi | ................. | G06F 12/0804 711/135 |
| 2006/0143396 A1* | 6/2006 | Cabot | ................... | G06F 12/121 711/134 |
| 2007/0094664 A1* | 4/2007 | So | ........................ | G06F 9/485 718/103 |
| 2010/0217952 A1* | 8/2010 | Iyer | ..................... | G06F 12/0864 711/209 |
| 2012/0226871 A1* | 9/2012 | Cantin | ................. | G06F 12/123 711/135 |
| 2013/0339621 A1* | 12/2013 | Steely, Jr | ............ | G06F 12/0891 711/133 |

* cited by examiner

*Primary Examiner* — Sanjiv Shah
*Assistant Examiner* — Alexander J Yoon
(74) *Attorney, Agent, or Firm* — Patterson + Sheridan, LLP (57) ABSTRACT

An in-memory cache for a computer system having a first storage and a second storage where the first storage is a cache for the second storage, tracks priority levels of block attributes stored therein. If a data item is cached in the first storage, the block attribute corresponding to the data item is stored in the in-memory cache as a high priority block attribute. If a data item evicted from the first storage, the block attribute corresponding to the data item is stored in the in-memory cache as a low priority block attribute. When the cache becomes full, the low priority block attributes are evicted before the high priority block attributes.

12 Claims, 5 Drawing Sheets

SYSTEM AND METHODS OF AN EFFICIENT CACHE ALGORITHM IN A HIERARCHICAL STORAGE SYSTEM

BACKGROUND

Caching is important to achieve good performance in most storage systems. This is especially true for highly-scalable storage systems, such as virtual storage area network (VSAN), and hierarchical storage systems that have two tiers of persistent storage: a fast small tier 1 storage (usually solid-state drives), and a slow large tier 2 storage (usually magnetic drives). Tier 2 storage has much larger capacity than tier 1 storage, in some implementations about twenty times larger. In order to speed up accesses to data stored in tier 2 storage, tier 1 storage includes a cache which caches data stored in tier 2 storage.

In storage systems, block attributes, such as checksums and content based keys, are used to verify the integrity of the stored data. These block attributes are stored in an in-memory cache so that the verification process for cached data can be quickly performed and does not adversely impact the IO performance when cached data is accessed. Accordingly, as the size of the cache in tier 1 storage increases, the size of the in-memory cache should increase proportionally to sustain good IO performance for cached data. For large-scale storage systems, however, as the size of the cache in tier 1 storage becomes increasingly large, the memory requirements of the in-memory cache may become prohibitive.

DETAILED DESCRIPTION

Figure 1:
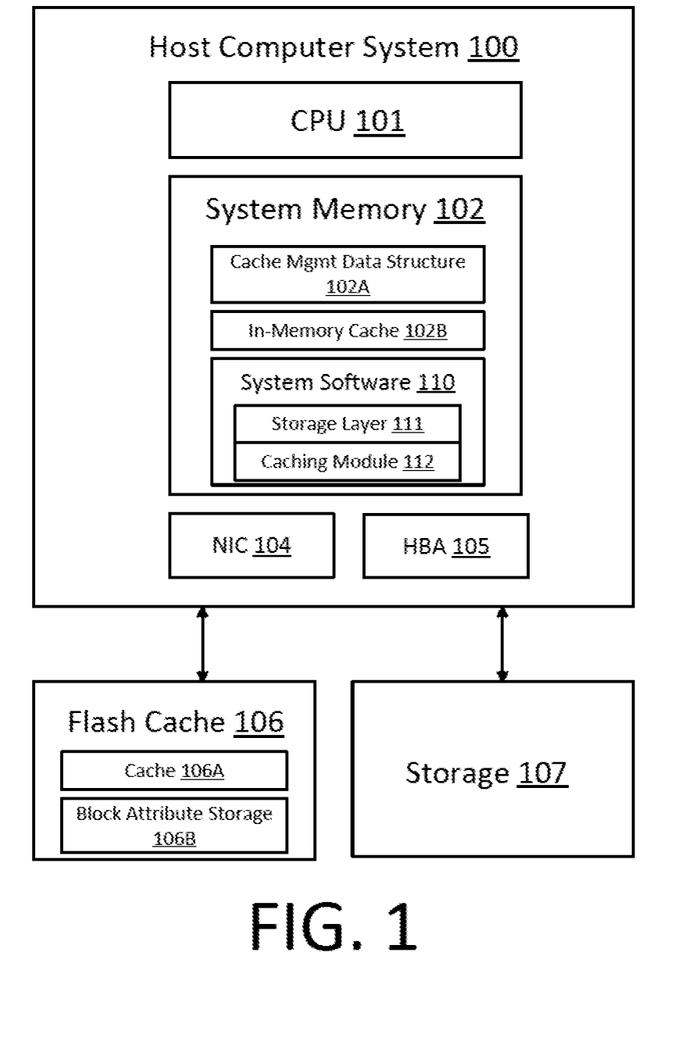
FIG. 1 depicts a block diagram of a computer system in which embodiments may be practiced.

FIG. 1 depicts a block diagram of a computer system in which embodiments may be practiced. The particular example illustrated in FIG. 1 is a host computer system (host) 100 that employs tier 1 storage, e.g., flash cache 106 which is made up of flash memory devices, and tier 2 storage, e.g., storage 107 which represents mass storage and is made up magnetic drives. The tier 1 storage has much higher performance (lower latency, faster read/write times, more input/output operations (10) per second) than the tier 2 storage. The tier 2 storage, however, has much larger capacity (in one embodiment, about twenty times larger) than the tier 1 storage because of its lower cost per unit storage. In the embodiments, flash cache 106 includes cache 106A for caching data stored in storage 107 to improve the overall IO performance of host 100.

Host 100 includes conventional components of a computer system. As depicted in FIG. 1, host 100 includes one or more central processing units (CPU) 101, system memory (e.g., dynamic random access memory) 102, one or more network interface controllers (NIC) 104, and one or more host bus adapters (HBA) 105. In one embodiment, storage 107 is remote to host 100, and accessed over an IP network as network-attached storage through NIC 104, or a storage area network (SAN) or a virtual SAN through HBA 105, and flash cache 106 is connected locally to host 100. In another embodiment, flash cache 106 is remote to host 110 and shared among a plurality of hosts.

As depicted in FIG. 1, host 100 includes system software 110 for supporting applications, including virtual computing instances, such as virtual machines and containers. System software 110 includes a storage layer 111 that translates IOs from applications to IOs directed to storage 107. System software 110 also includes a caching module 112 that employs a reserved area in flash 106, cache 106A, to cache the read data and write data associated with the IOs directed to storage 107.

According to embodiments, block attributes, e.g., checksums or content based keys, are used to verify the integrity of stored data. Block attributes of all stored data are generated when they are initially written to storage 107 and are stored in an area of flash cache 106, depicted in FIG. 1 as block attribute storage 106B. A much smaller version of block attribute storage 106B is stored in system memory 102 as an in-memory cache and is depicted in FIG. 1 as in-memory cache 102B. Caching module 112 employs cache management data structure 102A to manage the contents of in-memory cache 102B.

According to embodiments, caching module 112 tracks a priority level for each block attribute that is cached in in-memory cache 102B and employs well-known caching algorithms to evict low priority items from in-memory cache 102B when in-memory cache 102B is full. For example, caching module 112 may utilize a clock algorithm for high priority items and a FIFO algorithm for low priority items.

Figure 2:
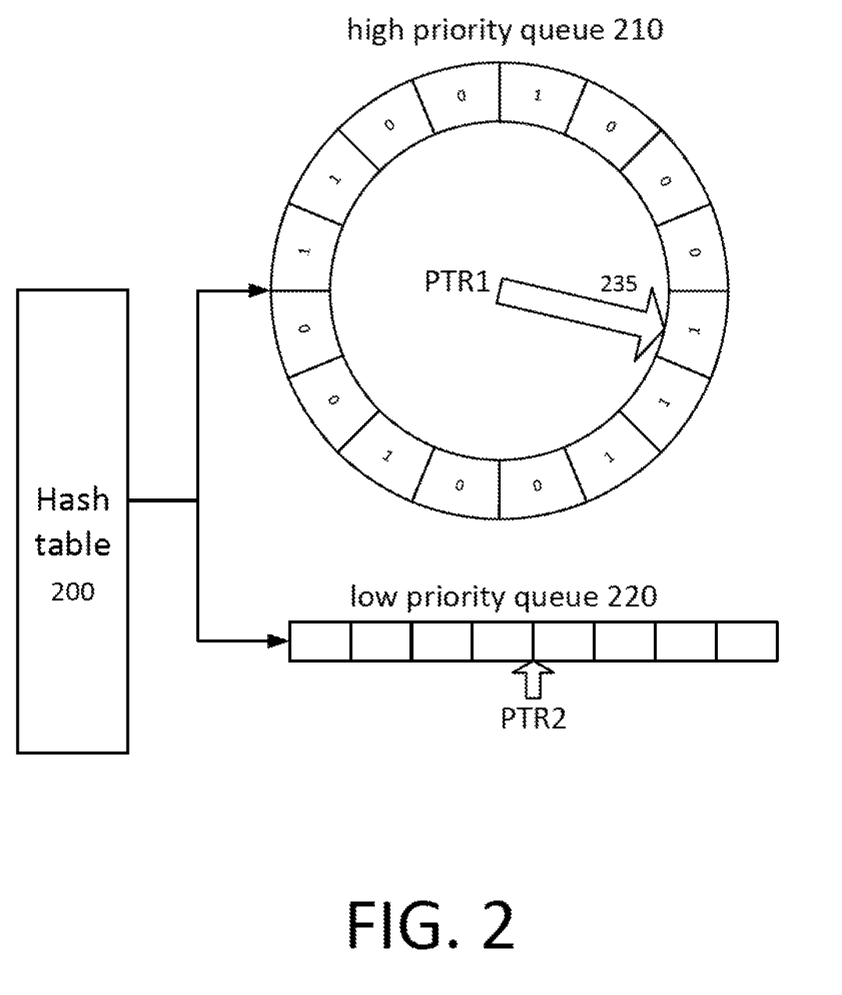
FIG. 2 depicts an example of a cache management data structure according to embodiments.

FIG. 2 depicts one embodiment of cache management data structure 102A. Caching module 112 maintains a high priority queue 210 and a low priority queue 220 as cache management data structure 102A, and adds an entry to high priority queue 210 if the data corresponding to the block attribute being added to in-memory cache 102B, is stored in cache 106A and adds an entry to low priority queue 220 if the data corresponding to the block attribute being added to in-memory cache 102B, is not stored in cache 106A.

In addition to high priority queue 210 and low priority queue 220, caching module 112 maintains a hash table 200 as part of cache management data structure 102A. Hash table 200 includes entries that are indexed according to a hash of a logical block address (LBA) of the data associated with the block attribute. Each entry of hash table 200 includes an LBA of the data whose block attribute is currently cached in in-memory cache 102B, and a pointer to a location in one of the queues of cache management data structure 102A where the LBA is stored together with a pointer to a location within in-memory cache 102B where the block attribute of the data corresponding to the LBA is stored.

As depicted in FIG. 2, high priority queue 210 is configured as a ring buffer that includes a plurality of storage locations that are accessed for writes in a circular manner using a pointer PTR1. Each storage location of high priority queue 210 has a reference bit associated therewith, and the reference bit is set to either 0 or 1. A reference bit of 0 indicates that the corresponding storage location has not been used recently. A reference bit of 1 indicates that the corresponding storage location has been used recently.

Before a data item is written into a storage location of high priority queue 210, an available storage location is searched for, beginning at the storage location referenced by the pointer PTR1. The pointer PTR1 is advanced one storage location at a time and each time the pointer PTR1 is advanced, the reference bit of the storage location that the pointer PTR1 advanced from is set to 0 so as to ensure that the pointer PTR1 can find an available storage location after one revolution. If a storage location having a reference bit of 0 is found, the data item is stored in that location. In the embodiments, the data item of high priority queue 210 includes an LBA and a pointer to a location within in-memory cache 102B where the block attribute of the data corresponding to the LBA is stored.

Low priority queue 220 is configured as a conventional FIFO (first-in, first out) buffer. FIG. 2 depicts a pointer PTR2 of low priority queue 220, which represents the next storage location into which a data item for low priority queue 220 is to be written. In the embodiments, the data item of low priority queue 220 includes an LBA and a pointer to a location within in-memory cache 102B where the block attribute of the data corresponding to the LBA is stored.

Figure 3A:
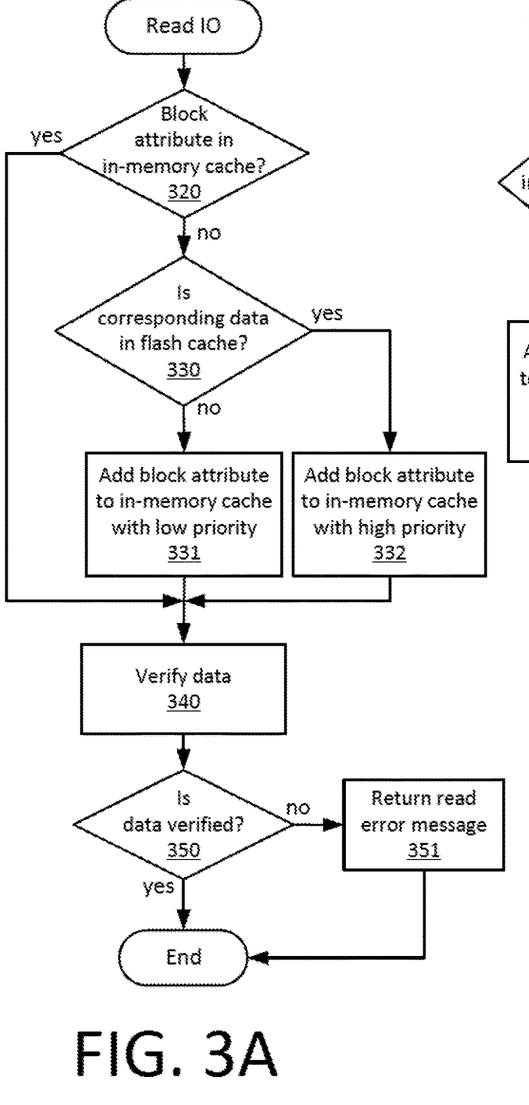
FIG. 3A depicts an example sequence of operations carried out when a read IO is issued.

FIG. 3A depicts an example sequence of operations carried out when a read IO is issued by system software 110. When system software 110 issues a read IO, caching module 112 determines if the block attribute of the data corresponding to the LBA of the read IO is currently in in-memory cache 102B in step 320. Caching module 112 makes this determination by checking hash table 200 to see if the LBA of the read IO is present in hash table 200. If the block attribute is not in in-memory cache 102B (No in step 320), caching module 112 determines whether the data corresponding to the IO is in flash cache 230, in step 330. Step 330 is carried out, for example, using a hash table of LBAs of data that are cached in 106A. If the data corresponding to the LBA of the read IO is not in cache 106A—that is, such data must be retrieved from storage 107—the block attribute is retrieved from block attribute storage 106B and added to in-memory cache 102B with a low priority (e.g., added to low priority queue 220), in step 331, and processing proceeds thereafter to step 340. If the data corresponding to the LBA of the read IO is in cache 106A, the block attribute is retrieved from block attribute storage 106B and added to in-memory cache 102B with a high priority (e.g., added to high priority queue 210), and processing proceeds thereafter to step 340. Returning to step 320, if the block attribute is in in-memory cache 102B (yes in step 320), cache management data structure 102A is not updated and the process proceeds directly to step 340.

In step 340, the data corresponding to the LBA of the read IO is subjected to data verification. For example, in the case where the block attribute is a checksum, the data is subjected to a checksum function. In step 350, caching module 112 determines whether the data corresponding to the LBA of the read IO is verified. In the case where the block attribute is a checksum, caching module 112 determines whether the checksum function returns the same value as the stored checksum. If so (yes in step 350), the data is determined to be valid, and the process ends thereafter. If not (no in step 350), a read error message is returned in step 351, and the process ends thereafter.

Figure 3B:
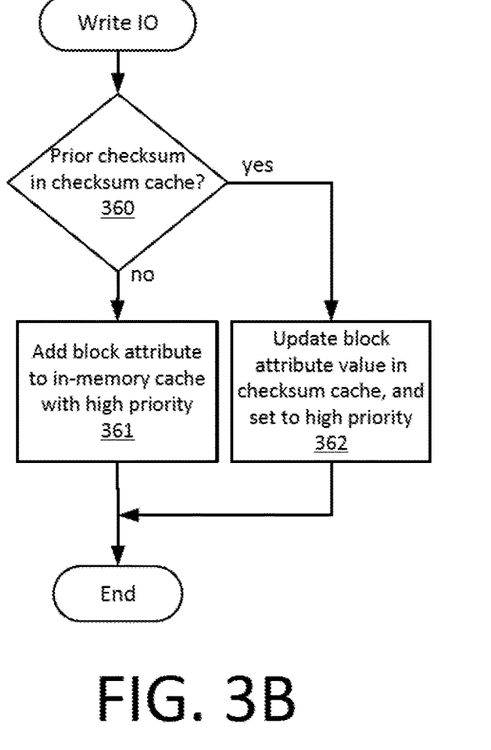
FIG. 3B depicts an example sequence of operations carried out when a write IO is issued.

When system software 110 issues a write IO, the data corresponding to the LBA of the write IO is changed. Accordingly, the previous block attribute corresponding to the LBA are no longer valid, and a new block attribute value is calculated and stored in block attribute storage 106B in association with the LBA. Therefore, in the case of a write IO, caching module 112 updates in-memory cache 102B with the new block attribute value.

FIG. 3B depicts an example sequence of operations carried out when a write IO is issued by system software 110. In step 360, caching module 112 determines whether a block attribute of the data corresponding to the LBA of the write IO is in in-memory cache 102B. Caching module 112 makes this determination by checking hash table 200 to see if the LBA of the write IO is present in hash table 200. If the block attribute is not in in-memory cache 102B (no in step 360), caching module 112 calculates the new block attribute value and adds the new block attribute value to in-memory cache 102B in step 361. In addition, caching module 112 adds the LBA of the write IO to high priority queue 210 and updates hash table 200 to include the LBA of the write M. If the block attribute is in in-memory cache 102B (yes in step 360), caching module 112 calculates the new block attribute value and updates the block attribute value in in-memory cache 102B in step 362. In addition, if the LBA of the write IO was in low priority queue 220, caching module 112 moves the LBA of the write IO to high priority queue 210 and updates hash table 200 to indicate the new location of the LBA in the queues. The process ends thereafter.

Figure 4:
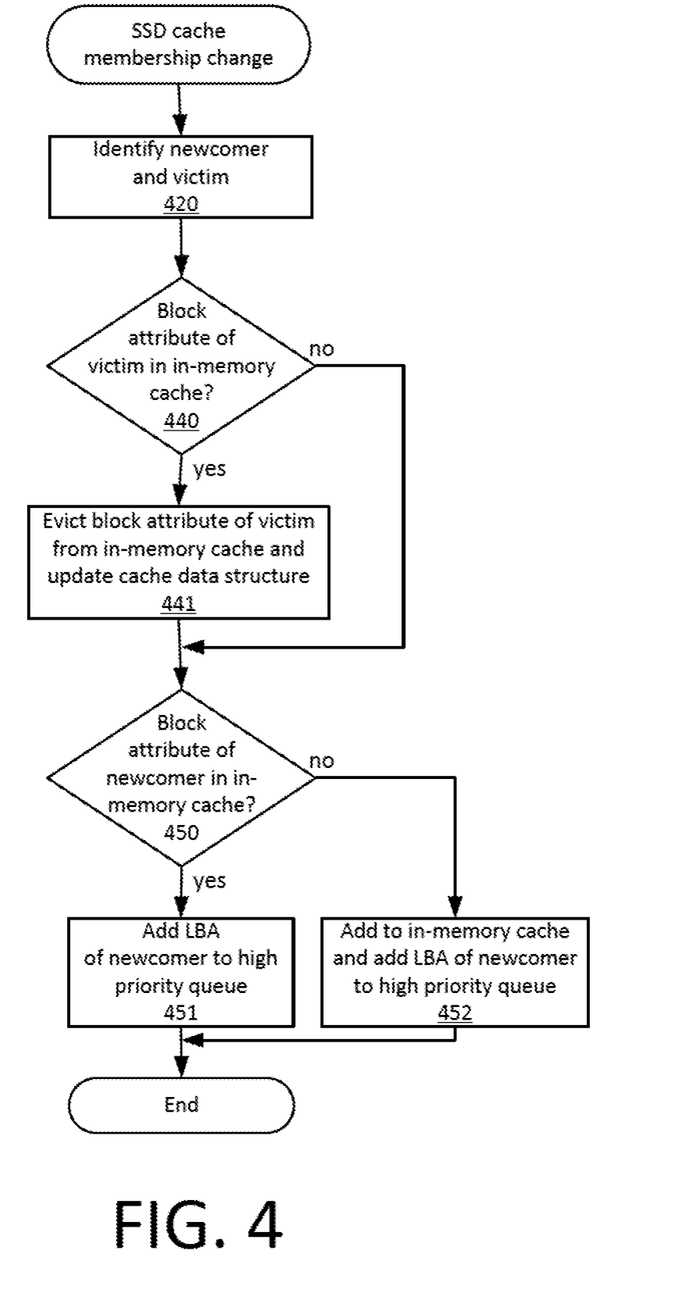
FIG. 4 depicts an example sequence of operations carried out when a cache membership changes.

FIG. 4 depicts an example sequence of operations carried out when the contents of cache 106A are changed. As noted above, cache 106A is used to speed up access to data stored in storage 107. Accordingly, when system software 110 issues a read IO for data that is not in cache 106A, the data is retrieved from storage 107 and stored in cache 106A. If cache 106A is full, an entry must be evicted (hereinafter referred to as the "victim") so that the data retrieved from storage 107 (hereinafter referred to as the "newcomer") can be stored in cache 106A. In the embodiments, any of the well-known cache replacement algorithms which supports priorities may be implemented for cache 106A.

In step 420, the newcomer and the victim are identified according to the cache replacement algorithm. In step 440, caching module 112 determines whether the block attribute of the victim is in in-memory cache 102B. Caching module 112 makes this determination by checking hash table 200 to see if the LBA of the victim is present in hash table 200. If the block attribute of the victim is in in-memory cache 102B (yes in step 440), the block attribute of the victim is evicted from in-memory cache 102B and cache management data structure 102A is updated accordingly. The process thereafter continues to step 450. If the block attribute of the victim is not in in-memory cache 102B (no in step 440), the process proceeds directly to step 450.

In step 450, caching module 112 determines whether the block attribute of the newcomer is in in-memory cache 102B. Caching module 112 makes this determination by checking hash table 200 to see if the LBA of the newcomer is present in hash table 200. If the block attribute of the newcomer is in in-memory cache 102B (yes in step 450), caching module 112 moves the LBA of the newcomer to high priority queue 210 (or maintains the LBA in high priority queue 210 if it is already in high priority queue 210) and makes appropriate changes to hash table 200 in step 451. If the block attribute of the newcomer is not in in-memory cache 102B (no in step 450), the block attribute of the newcomer is added to in-memory cache 102B in step 452. In addition, caching module 112 adds the LBA of the newcomer to high priority queue 210 and updates hash table 200 to include the LBA of the newcomer.

Figure 5:
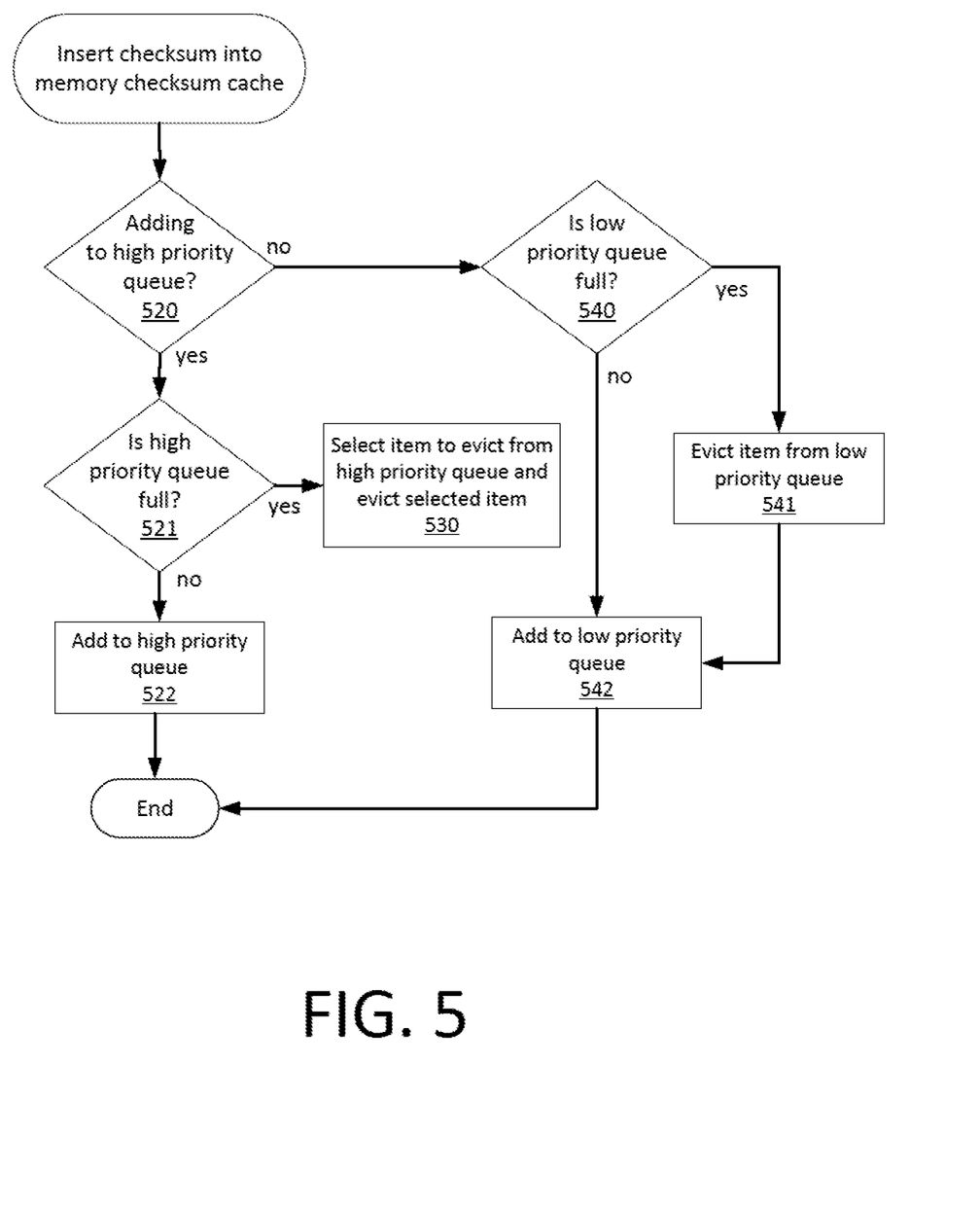
FIG. 5 depicts an example sequence of operations carried out when inserting a block attribute into an in-memory cache.

FIG. 5 depicts an example sequence of operations carried out when inserting a block attribute of data associated with an LBA into in-memory cache 102B. In the embodiment illustrated herein, caching module 112 manages in-memory cache 102B using cache management data structure 102A that includes hash table 200 and high and low priority queues 210, 220.

In step 510, caching module 112 determines a block attribute of high priority is being added. If a block attribute of high priority is being added (yes in step 520), step 521 is executed where caching module 112 checks to see if high priority queue 210 is full. If a block attribute of low priority is being added (no in step 520), step 540 is carried out where caching module 112 checks to see if low priority queue 220 is full. If, in step 521, caching module 112 determines that high priority queue 210 is full, caching module 112 in step 530 selects a block attribute to evict from high priority queue 210, and thereafter executes step 540. If, in step 521, caching module 112 determines that high priority queue 210 is not full, caching module 112 in step 522 adds the LBA associated with the block attribute (and the associated pointer to a location within in-memory cache 102B) to high priority queue 210 and updates hash table 200 accordingly. The process thereafter ends.

If, in step 540, caching module 112 determines that low priority queue 220 is full, caching module 112 in step 541 evicts an item from low priority queue 220, and thereafter executes step 542. If, in step 540, caching module 112 determines that low priority queue 220 is not full, caching module 112 in step 542 adds the LBA associated with the block attribute (and the associated pointer to a location within in-memory cache 102B) to low priority queue 220 and updates hash table 200 accordingly. The process thereafter ends.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing a first cache by a cache management module in system software in a manner that distinguishes between high and low priority items, wherein the first cache is maintained in memory and stores block attributes corresponding to data items stored in a first storage and block attributes corresponding to data items stored in a second storage, and
    wherein the first storage stores the block attributes corresponding to the data items stored in the second storage, and wherein the block attributes corresponding to the data items stored in the second storage are added to the first storage when data items stored in the second storage are written to the second storage; and
    wherein the first storage contains a second cache that caches data items stored in the second storage; and
    wherein the block attributes are stored in the first cache as high priority block attributes or low priority block attributes, and wherein the block attributes that are stored in the first cache are a subset of the block attributes that are stored in the first storage; and
    wherein a first data structure maintained in memory contains a pointer to each of the high priority block attributes stored in the first cache and a second data structure maintained in memory contains a pointer to each of the low priority block attributes stored in the first cache, the method comprising:
    responsive to a read input/output operation (read IO), adding a block attribute of data targeted by the read IO to the first cache as a high priority block attribute by adding a pointer to the first data structure that points to a storage location of the block attribute of the data targeted by the read IO in the first cache when the data targeted by the read IO is retrieved from the second cache of the first storage;
    responsive to the read IO, adding the block attribute of the data targeted by the read IO to the first cache as a low priority block attribute by adding a pointer to the second data structure that points to the storage location of the block attribute of the data targeted by the read IO in the first cache when the data targeted by the read IO is retrieved from the second storage;
    responsive to a write input/output operation (write IO), determining if a second block attribute of a data item corresponding to a logical block address (LBA) of the write IO is stored in the first cache by checking a hash table for the LBA of the data item, the hash table stored in the memory;
    if the second block attribute of the data item is stored in the first cache, setting a priority of the second block attribute to be high priority by adding a second pointer into the first data structure that points to a second storage location of the second block attribute in the first cache, and updating the hash table to associate the LBA of the data item with a location of the second pointer in the first data structure; and
    if the block attribute of the data item is not stored in the first cache, adding the second block attribute of the data item to the first cache and setting the priority of the added second block attribute to be high priority by adding the second pointer into the first data structure that points to the second storage location of the second block attribute in the first cache, and updating the hash table to both add the LBA of the data item to the hash table and associate the LBA of the data item with the location of the second pointer in the first data structure.

2. The method of claim 1, further comprising:
    responsive to caching a first data item in the second cache, evicting a second data item from the second cache and determining if a block attribute of the evicted second data item is stored in the first cache; and
    if the block attribute of the evicted second data item is stored in the first cache, evicting the block attribute of the evicted second data item from the first cache.

3. The method of claim 1, further comprising:
    responsive to the write IO, generating the second block attribute.

4. The method of claim 1, wherein the first data structure comprises a ring buffer, and wherein the second data structure comprises a first-in-first-out data buffer.

5. A non-transitory computer readable medium comprising instructions for managing a first cache by a cache management module in system software in a manner that distinguishes between high and low priority items, wherein the first cache is maintained in memory of a computer system and stores block attributes corresponding to data items stored in a first storage and block attributes corresponding to data stored in a second storage, and
    wherein the first storage stores the block attributes corresponding to the data items stored in the second storage, and wherein the block attributes corresponding to the data items stored in the second storage are added to the first storage when data items stored in the second storage are written to the second storage; and
    wherein the first storage contains a second cache that caches data items stored in the second storage; and
    wherein the block attributes are stored in the first cache as high priority block attributes or low priority block attributes, and wherein the block attributes that are stored in the first cache are a subset of the block attributes that are stored in the first storage; and
    wherein a first data structure maintained in memory contains a pointer to each of the high priority block attributes stored in the first cache and a second data structure maintained in memory contains a pointer to each of the low priority block attributes stored in the first cache, and the instructions, when executed in the computer system, cause the computer system to perform the steps of:
    responsive to a read input/output operation (read IO), adding a block attribute of data targeted by the read IO to the first cache as a high priority block attribute by adding a pointer to the first data structure that points to a storage location of the block attribute of the data targeted by the read IO in the first cache when the data targeted by the read IO is retrieved from the second cache of the first storage;

responsive to the read IO, adding the block attribute of the data targeted by the read IO to the first cache as a low priority block attribute by adding a pointer to the second data structure that points to the storage location of the block attribute of the data targeted by the read IO in the first cache when the data targeted by the read IO is retrieved from the second storage;

responsive to a write input/output operation (write IO), determining if a second block attribute of a data item corresponding to a logical block address (LBA) of the write IO is stored in the first cache by checking a hash table for the LBA of the data item, the hash table stored in the memory;

if the second block attribute of the data item is stored in the first cache, setting a priority of the second block attribute to be high priority by adding a second pointer into the first data structure that points to a second storage location of the second block attribute in the first cache, and updating the hash table to associate the LBA of the data item with a location of the second pointer in the first data structure; and if the block attribute of the data item is not stored in the first cache, adding the second block attribute of the data item to the first cache and setting the priority of the added second block attribute to be high priority by adding the second pointer into the first data structure that points to the second storage location of the second block attribute in the first cache, and updating the hash table to both add the LBA of the data item to the hash table and associate the LBA of the data item with the location of the second pointer in the first data structure.

6. The non-transitory computer readable medium of claim 5, wherein the steps performed further comprise:

responsive to caching a first data item in the second cache, evicting a second data item from the second cache and determining if a block attribute of the evicted second data item is stored in the first cache; and if the block attribute of the evicted second data item is stored in the first cache, evicting the block attribute of the evicted second data item from the first cache.

7. The non-transitory computer readable medium of claim 5, wherein the steps performed further comprise:

responsive to the write IO, generating the second block attribute.

8. The non-transitory computer readable medium of claim 5, wherein the first data structure comprises a ring buffer, and wherein the second data structure comprises a first-in-first-out data buffer.

9. A computer system comprising:

a processor;

system memory including a cache management module in system software that distinguishes between high and low priority items, and a first cache that caches block attributes of data items; and a first storage and a second storage, wherein the first storage stores the block attributes corresponding to the data items stored in the second storage, and wherein the block attributes corresponding to the data items stored in the second storage are added to the first storage when data items stored in the second storage are written to the second storage, and further wherein the first storage contains a second cache that caches data items of the second storage, wherein the processor is programmed to:

store, in the first cache, block attributes corresponding to data items stored in the first storage and block attributes corresponding to data items stored in the second storage, as either a high priority block attribute or a low priority block attribute, a first data structure in memory containing a pointer to each of the high priority block attributes stored in the first cache, and a second data structure in memory containing a pointer to each of the low priority block attributes stored in the first cache, wherein the block attributes that are stored in the first cache are a subset of the block attributes that are stored in the first storage;

responsive to a read input/output operation (read IO), add a block attribute of data targeted by the read IO to the first cache as a high priority block attribute by adding a pointer to the first data structure that points to a storage location of the block attribute of the data targeted by the read IO in the first cache when the data targeted by the read IO is retrieved from the second cache of the first storage;

responsive to the read IO, add the block attribute of the data targeted by the read IO to the first cache as a low priority block attribute by adding a pointer to the second data structure that points to the storage location of the block attribute of the data targeted by the read IO in the first cache when the data targeted by the read IO is retrieved from the second storage;

responsive to a write input/output operation (write IO), determine if a second block attribute of a data item corresponding to a logical block address (LBA) of the write IO is stored in the first cache by checking a hash table for the LBA of the data item, the hash table stored in the system memory;

if the second block attribute of the data item is stored in the first cache, set a priority of the second block attribute to be high priority by adding a second pointer into the first data structure that points to a second storage location of the second block attribute in the first cache, and update the hash table to associate the LBA of the data item with a location of the second pointer in the first data structure; and if the block attribute of the data item is not stored in the first cache, add the second block attribute of the data item to the first cache and setting the priority of the added second block attribute to be high priority by adding the second pointer into the first data structure that points to the second storage location of the second block attribute in the first cache, and update the hash table to both add the LBA of the data item to the hash table and associate the LBA of the data item with the location of the second pointer in the first data structure.

10. The computer system of claim 9, wherein the processor is further programmed to:

evict a second data item from the second cache and determine if a block attribute of the evicted second data item is stored in the first cache, responsive to caching a first data item in the second cache; and evict the block attribute of the evicted second data item from the first cache, if the block attribute of the evicted second data item is stored in the first cache.

11. The computer system of claim 9, wherein the processor is further programmed to:

responsive to the write IO, generate the second block attribute.

12. The computer system of claim 9, wherein the first data structure comprises a ring buffer, and wherein the second data structure comprises a first-in-first-out data buffer.

\* \* \* \* \*